United States Patent [19]

Salama et al.

[11] Patent Number: 5,164,032
[45] Date of Patent: Nov. 17, 1992

[54] METHOD OF FORMING A DECORATIVE ARTICLE

[75] Inventors: Albert T. Salama; Dennis Conger, both of Sayreville, N.J.

[73] Assignee: Sabert Corporation, Sayreville, N.J.

[21] Appl. No.: 696,775

[22] Filed: May 7, 1991

[51] Int. Cl.⁵ ............................................. B29C 47/06
[52] U.S. Cl. ........................... 156/242; 156/244.11; 156/244.12; 156/244.23; 156/244.24; 156/244.25; 156/245; 156/276; 156/285
[58] Field of Search .............. 156/244.11, 244.12, 156/244.23, 244.24, 244.25, 276, 242, 245, 267, 285

[56] References Cited

U.S. PATENT DOCUMENTS

| | | | |
|---|---|---|---|
| 1,175,624 | 3/1916 | Fawkes | 156/276 |
| 3,232,818 | 2/1966 | Loew et al. | 156/276 |
| 3,238,284 | 3/1966 | Sutton | 264/216 |
| 3,414,455 | 12/1968 | Twomey, Jr. et al. | 161/5 |
| 3,436,297 | 4/1969 | Brooks et al. | 156/244.25 |
| 3,440,129 | 4/1969 | Anselm | 156/244.25 |
| 3,749,629 | 7/1969 | Andrews et al. | 156/276 |
| 3,843,475 | 10/1974 | Kent | 156/244.25 |
| 4,197,337 | 4/1980 | DiBiasi et al. | 427/270 |
| 4,560,607 | 12/1985 | Sumner | 428/141 |
| 4,950,525 | 8/1990 | Bailey | 156/276 |
| 4,968,370 | 11/1990 | Watkins | 156/232 |

Primary Examiner—Caleb Weston
Attorney, Agent, or Firm—Ezra Sutton

[57] ABSTRACT

The present invention provides an improved article and process wherein metallic particles, such as aluminum, are encapsulated into a molten plastic material. The molten layer is then laminated to another plastic layer, without glue or adhesive. The composite sheet is molded into the shape of the desired article, such as a dinner plate. The final article has a bright, mirror-like finish with an aluminum color, since the aluminum particles are clearly visible through the transparent plastic material.

8 Claims, 3 Drawing Sheets

METHOD OF FORMING A DECORATIVE ARTICLE

FIELD OF THE INVENTION

The present invention relates to a method for forming articles, such as a dinner plate or serving platter, by encapsulating metallic particles into a molten plastic material and molding the material into the desired shape.

BACKGROUND OF THE INVENTION

In the prior art, in order to form the desired article, the plastic layers are adhered by adhesive or glue, or utilize a solvent, with the metallic particles dispersed between the layers. Such a process has the drawback of providing an article with a dull finish, since the metallic particles are at least partly obscured by the glue, adhesive, or solvent.

It is therefore an object of the present invention to provide an improved process and article which provides an article with a mirror-like finish by avoiding the use of glue or adhesive and by encapsulating the metallic particles in a molten plastic layer. By eliminating this step, a less costly and more efficient process is provided by the present invention.

SUMMARY OF THE INVENTION

In the present invention, there is provided a method of laminating and molding to form an article, such as a plate, having a mirror-like, metallized appearance comprising the steps of extruding a first layer of transparent molten plastic from an extruder die in the form of a molten plastic stream having a temperature of at least 425° F. and supplying a second layer of transparent plastic having metallic particles on its surface.

The first and second layers are brought into contact while the first layer is still molten to encapsulate the metallic particles in the first layer of molten plastic and to form a composite sheet wherein the metallic particles are dispersed between transparent, outer plastic layers. The composite sheet is heated in an oven, and then it is molded into the shape of an article using vacuum and pressure in the mold.

Finally, the excess material is removed from around the article to form the completed article having a metallized appearance and a mirror-like finish.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF PREFERRED EMBODIMENT

Figure 1:
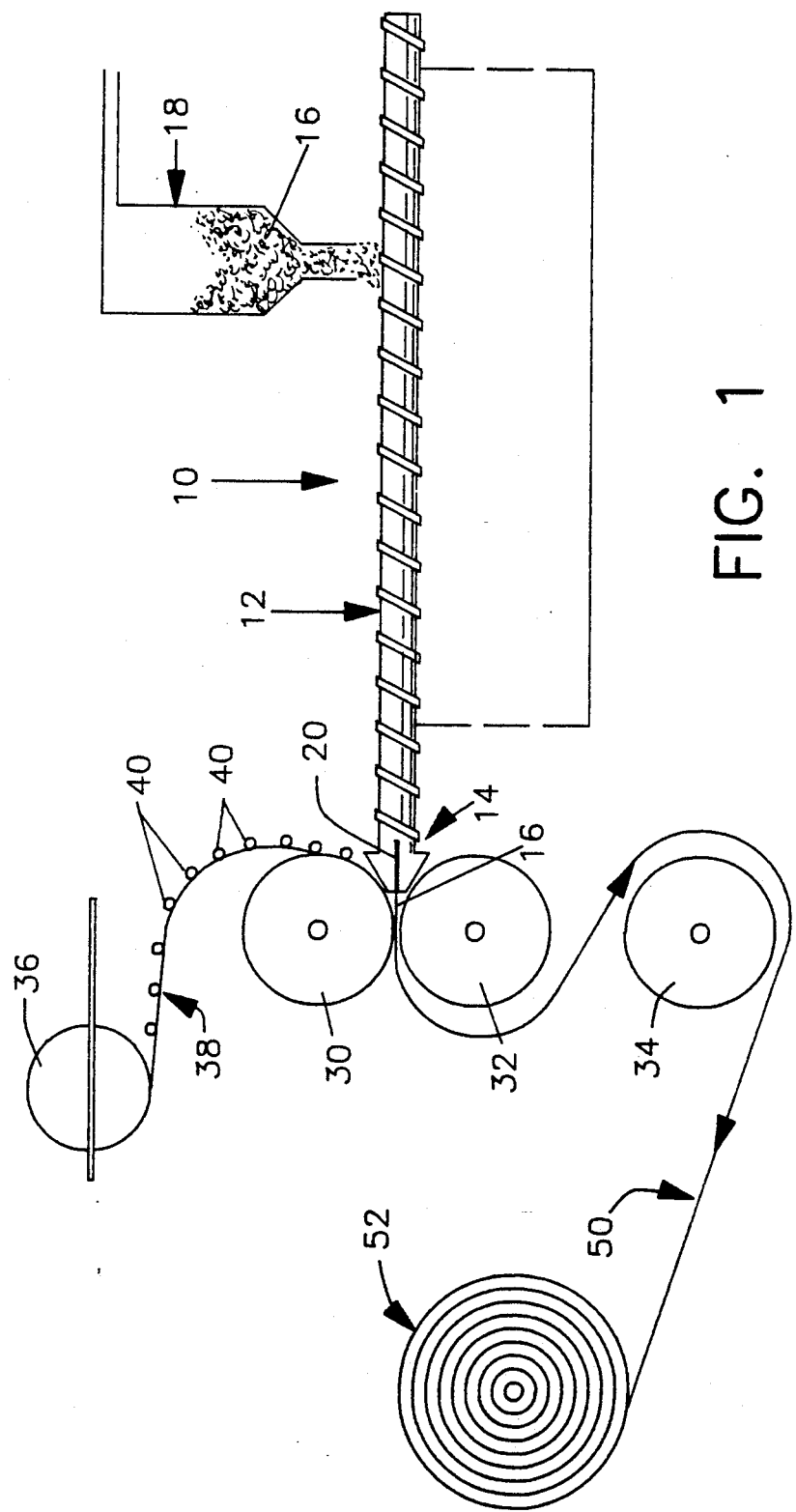
FIG. 1 is an elevational view of the extruding and laminating steps of the process.
Figure 3:
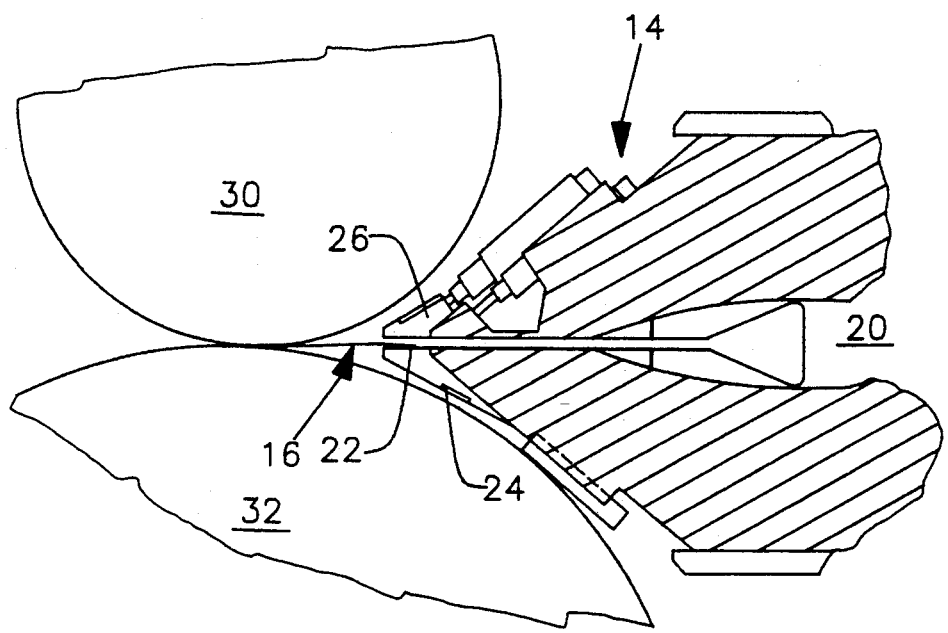
FIG. 3 is a detailed view of the extruder die and rollers.

As shown in FIG. 1, there is an extruder 10 having a single extruder screw 12 and an extruder die 14. Preferably, the extruder has a length/diameter ratio of 24 to 1. The plastic material 16 is supplied to extruder 10 from a supply unit 18. As seen in FIG. 3, the extruder die 14 includes a streamlined manifold 20 for supplying the plastic material 16 through orifice 22 and lip heaters 24 and die lips 26.

The extruder 10 extrudes molten plastic 16 from the extruder die 14 in the form of a molten plastic stream having a temperature of at least 425° F. Plastic layer 16 preferably is PET and is transparent.

The apparatus includes temperature-controlled rollers 30, 32, and 34 disposed closely adjacent to the output of extruder die 14 and having a temperature in excess of 90° F. and preferably less than 140° F. A roll 36 of metallized plastic supplies a layer of transparent plastic 38 to rollers 30, 32, and 34. Metallic particles 40 are dispersed on one surface of plastic layer 38. The metallic particles may be aluminum, copper, copper alloys, bronze, zinc, gold, or stainless steel. Plastic layer 38 is preferably biaxially oriented polyethylene terephthalate (PET) or biaxially oriented polypropylene with metallic particles dispersed on it in accordance with methods of vacuum metallization as known in the art.

Layers 16 and 38 are brought into contact with each other by rollers 32 and 34, while layer 16 is still molten to completely encapsulate the metallic particles 40 in molten layer 16 to form a composite sheet 50, wherein the metallic particles 40 are disposed between the transparent, outer plastic layers. The composite sheet 50 is supplied to a roll 52 to form a roll stack until the sheet 50 is ready for use. Preferably, the upper layer 38 of PET is fully transparent and has a thickness of a ½ mil, and the extruded layer 16 of PET is fully transparent and has a thickness of 5 to 40 mils. Since the metallic particles 40 are completely encapsulated without any adhesive or glue, this allows clear visibility, through the transparent plastic outer layers, of the metallic particles 40 to provide a finished article having a metallized appearance and a mirror-like finish.

Figure 2:
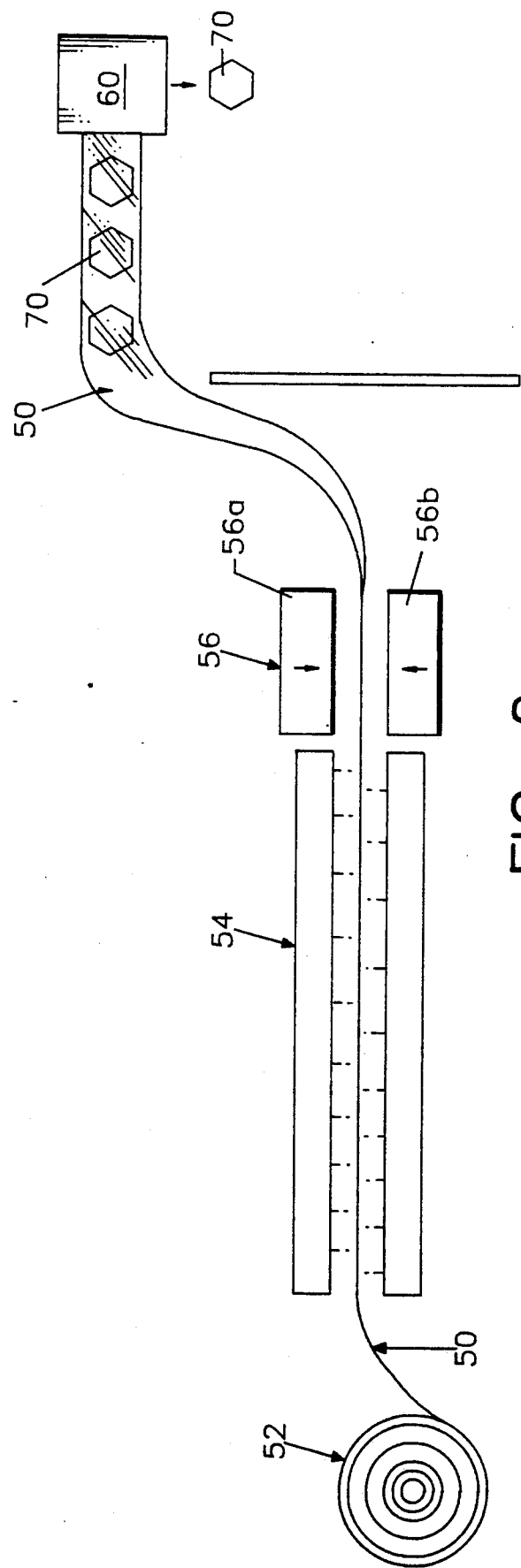
FIG. 2 is an elevational view of the heating, molding, and trimming steps of the process.

As shown in FIG. 2, the apparatus includes an oven 54 and a mold 56 having an upper section 56a and a lower section 56b. The composite sheet 50 is heated in oven 54 and then moved into mold 56 to mold the composite sheet 50 into the shape of an article using a vacuum and pressure of about 100 PSI, in a conventional manner. The oven temperature is in the range of 300° F. to 600° F.

The oven length is four to five times the length of the mold. For example, oven 54 may be 125 inches long, and mold 56 may have a length of 25 inches. In this manner, the longer oven allows sufficient residence time for composite sheet 50 in the oven to overcome the reflective properties of the metallic particles in order to maintain pliability while preventing crystallization. In the oven 54, the heat source may be of the forced air type, or infrared heat, or radiant heat, or contact heat.

The molded composite sheet 50 is then supplied to a trim press 60 having a die 62 to remove the excess material from around the formed article 70. The completed article 70 has a metallized appearance and a mirror-like finish. The completed article may be a dinner plate or a serving platter or any other article having the characteristics described herein, including having a capacity to bend and fold, without cracking and to return to its original flat configuration without any detrimental effect.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method of laminating and molding to form an article having a mirror finish and metallized appearance comprising the steps of:
   a) extruding a first layer of transparent molten plastic from an extruder die in the form of a molten plastic stream having a temperature of at least 425° F.;
   b) supplying a second layer of transparent plastic having metallic particles deposited on its surface without the use of a carrier which hinders the clarity of the metallic particles;
   c) contacting said first and second layers while said first layer is still molten to encapsulate said metallic particles in said first layer of molten plastic and to form a composite sheet wherein the metallic particles are dispersed between transparent, outer plastic layers;
   d) heating said composite sheet in an oven gradually as said composite sheet moves through said oven to prevent crystallization and to maintain the pliability of said article;
   e) molding said composite sheet into the shape of an article using a vacuum and pressure in a mold to obtain a mirror finish; and
   f) removing the excess material from around said article to form the completed article having a metallized appearance and a mirror finish.

2. The method of claim 1 wherein the step of contacting said first and second layers employs a plurality of temperature-controlled rollers.

3. The method of claim 2 wherein the step of extruding includes supplying said first layer of molten plastic directly from said extruder die to the nip of said temperature-controlled rollers.

4. The method of claim 1 wherein the step of heating is performed in an oven having a length equal to at least four times the length of said mold.

5. The method of claim 1 wherein the step of extruding said first layer of molten plastic includes the step of extruding a non-vinyl plastic, polyethylene terephthalate (PET), which is a thermoplastic resin.

6. The method of claim 1 wherein said metallic particles are aluminum.

7. The method of claim 1 wherein said metallic particles are copper, bronze, zinc, or stainless steel.

8. The method of claim 1 wherein said second layer is formed of biaxially oriented plastic.

* * * * *